US005481875A

United States Patent [19]

Takamura et al.

[11] Patent Number: 5,481,875

[45] Date of Patent: Jan. 9, 1996

[54] APPARATUS FOR CHANGING AND CONTROLLING VOLUME OF HYDRAULIC OIL IN HYDRAULIC EXCAVATOR

[75] Inventors: Fujitoshi Takamura; Yoshinao Haraoka, both of Hirakata, Japan

[73] Assignee: Kabushiki Kaisha Komatsu Seisakusho, Tokyo, Japan

[21] Appl. No.: 64,055

[22] PCT Filed: Sep. 25, 1992

[86] PCT No.: PCT/JP92/01225

§ 371 Date: May 19, 1993

§ 102(e) Date: May 19, 1993

[87] PCT Pub. No.: WO93/06314

PCT Pub. Date: Apr. 1, 1993

[30] Foreign Application Priority Data

Sep. 27, 1991 [JP] Japan .................................... 3-274930

[51] Int. Cl.[6] ...................................................... F16D 31/02

[52] U.S. Cl. ................................................ 60/443; 60/452

[58] Field of Search ............................ 60/431, 449, 450, 60/452, 434, 443

[56] References Cited

U.S. PATENT DOCUMENTS

| | | | |
|---|---|---|---|
| 4,697,418 | 10/1987 | Okabe et al. | 60/431 X |
| 4,726,186 | 2/1988 | Tatsumi et al. | 60/434 |
| 4,773,369 | 9/1988 | Kobayashi et al. | 60/434 X |
| 4,809,504 | 3/1989 | Izumi et al. | 60/449 X |
| 4,904,161 | 2/1990 | Kamide et al. | 60/434 X |
| 5,077,973 | 1/1992 | Suzuki et al. | 60/431 X |
| 5,079,919 | 1/1992 | Nakamura et al. | 60/450 X |
| 5,085,051 | 2/1992 | Hirata | 60/452 X |
| 5,146,746 | 9/1992 | Nagai et al. | 60/452 X |
| 5,249,421 | 10/1993 | Lunzman | 60/452 X |
| 5,267,441 | 12/1993 | Devier et al. | 60/452 |
| 5,285,642 | 2/1994 | Watanabe et al. | 60/452 |

FOREIGN PATENT DOCUMENTS

| | | |
|---|---|---|
| 62-220703 | 9/1987 | Japan . |
| 2-164941 | 6/1990 | Japan . |
| 2-291436 | 12/1990 | Japan . |
| 3-74605 | 3/1991 | Japan . |
| 3-212524 | 9/1991 | Japan . |

*Primary Examiner*—John E. Ryznic
*Attorney, Agent, or Firm*—Richards, Medlock & Andrews

[57] ABSTRACT

A hydraulic oil volume change-over control apparatus for a hydraulic excavator subjects a hydraulic pump to load sensing control so as to set an optimum volume of hydraulic oil while an engine for driving the hydraulic pump is operated at a rotational speed at which the fuel consumption of the engine is minimum, by setting a low power mode during breaker work or the like which is performed with a smaller volume of hydraulic oil than that needed during normal excavating work. The control apparatus comprises a variable displacement hydraulic pump, an engine for driving the hydraulic pump, an actuator driven by the hydraulic pump, an actuator control valve disposed in pipe lines between the hydraulic pump and the actuator, a load sensing control device for the hydraulic pump, and a controller for computing a control signal for operating the engine at a minimum fuel consumption rate under a predetermined power designated by the working mode changeover device, so as to deliver the control signal to the load sensing control device and a governor drive device for the engine. The controller can receive signals from a volume sensor for the hydraulic pump, an engine rotational speed sensor for the engine, a hydraulic pressure sensor for the actuator, and the load sensing control device.

16 Claims, 7 Drawing Sheets

APPARATUS FOR CHANGING AND CONTROLLING VOLUME OF HYDRAULIC OIL IN HYDRAULIC EXCAVATOR

FIELD OF THE INVENTION

The present invention relates to an apparatus for changing and controlling the volume of hydraulic oil in a hydraulic excavator which is used for crushing a block of rock or a building and so forth with the use of a hydraulic breaker or a crusher as an attachment, instead of a bucket which is usually incorporated as a working unit, and in particular to an apparatus for changing and controlling the volume of hydraulic oil in a hydraulic excavator, adapted to set a low power mode in which a hydraulic pump is subjected to load sensing control so as to set an optimum hydraulic volume, and in which an engine for driving the hydraulic pump is driven under low fuel consumption during a breaker work or the like that requires a smaller volume of hydraulic oil as compared with a usual excavating work.

BACKGROUND OF THE INVENTION

It is sometimes necessary to attach a hydraulic breaker as an attachment, instead of a bucket which is usually incorporated as a working unit, to a hydraulic excavator in order to crush a building, a block of rock or the like. In this breaker work, a smaller volume of hydraulic oil, which is approximately one-half of that in the excavating work, is sufficient. Accordingly, the rotational speed of the engine is controlled to N1, N2 or N3 (rev/min) at a predetermined torque T0 by decreasing the volume of fuel injection along engine torque curves shown in FIG. 7, in order to aim at reducing fuel consumption of the engine, thereby controlling the hydraulic oil volume necessary for the breaker work while setting the volume of the hydraulic oil to V (cc/rev), so as to obtain a hydraulic volume of V*N1, V*N2 or V*N3 (cc/min). It is noted that the suction torque T of the hydraulic pump is exhibited by $T=kP\times V$ where K is a proportional constant, and P is a load pressure of the hydraulic pump, and accordingly, if the volume V (cc/rev) of the hydraulic oil is set to be constant, the load pressure P0 of the hydraulic pump using the torque T0 shown in FIG. 7 as the above-mentioned suction torque is proportional to the above-mentioned suction torque T0. Further, as shown in FIG. 8, a merging change-over circuit for two hydraulic pumps is provided, in which one of two service valves is changed over so as to change the flow rates of first and second pumps in order to control the volumes of hydraulic oil required respectively for an excavation work and a breaker work. That is, referring to FIG. 8, a variable displacement hydraulic pump (which will be simply denoted "main pump") 51, has connected in parallel thereto five control valves for driving actuators for turning, boom Hi, service, arm Lo and leftward running, and a main pump 52 has connected in parallel thereto five selector valves for driving actuators for rightward running, bucket, boom Lo, arm Hi and service. Further, pipe lines 54, 55 connected to outlet ports of a service valve 53 are connected respectively to hydraulic circuits extending from a left side service valve 56 to an actuator 57 for a breaker or the like, and are merged together. A pedal 58 for manipulating an attachment such as the breaker or the like abuts against a pilot pressure control valve 39 (which will be denoted "PPC valve"), using a control pump 40 as a hydraulic pressure source. One of two pilot circuits 41, 42 extending from the PPC valve 39, is connected to a left pilot cylinder belonging to the service valve 56, and the other one of them is connected to a right pilot cylinder of the service valve 56. Further, the pilot circuits 41, 42 are provided respectively with branch circuits 43, 44 which are connected to left and right pilot cylinders belonging to the service valve 53, by way of solenoid type pilot circuit selector valves 45, 46. Solenoids of these pilot circuit selector valves 45, 46 are connected to a change-over switch 50. During normal excavation work or the like, if the actuator 57 requires a flow rate corresponding to two pumps, the change-over switch 50 is manipulated to the turn-on side so that the solenoids of the pilot circuit selector valves 45, 46 are energized, and accordingly, the branch circuits 43, 44 of the pilot circuits 41, 42 are communicated so that the pilot pressure in accordance with a manipulation value to the pedal 58 acts upon the right or left pilot cylinders belonging to the service valve 53 and the service valve 56. Thus, the total flow rates from the main pumps 51, 52 act upon the actuator 57 for driving the attachment. Further, in such a case that a breaker work is carried out by the actuator 57, a flow rate corresponding to one pump is sufficient, and accordingly, the change-over switch 50 is manipulated onto the turn-off side. Accordingly, the solenoids of the pilot circuit selector valves 45, 46 are deenergized so that the branch circuits 43, 44 of the pilot circuits 41, 42 are blocked, and therefore a pilot pressure in accordance with a manipulation degree of the pedal 58 acts upon only the left or right pilot cylinder belonging to the service valve 56. Thus, a flow rate from the main pump 51 alone acts upon the actuator 57 for driving the hydraulic breaker. It is noted that a relief valve 47 and an orifice 48 are provided in the main circuit in order to control the discharge rate of the main pump in accordance with a movement of a spool in each of the control valves 56, and in particular to control the discharge rate of the main pump to a minimum value which can fill up a leakage volume of hydraulic oil so as to reduce the useless flow volume when all control valves are held at their neutral positions, and a flow rate regulating mechanism 49 for the main pump 52 is controlled by a pressure upstream of the orifice 48, thereby the discharge rate of the main pump 52 is controlled. As the control for the discharge rate of the main pump 51 is similar to that for the main pump 52, the explanation thereof is omitted. However, in a method in which the rotational speed of the engine is controlled as shown in FIG. 7 so as to obtain a volume of hydraulic oil required for the breaker work and to aim at reducing the fuel consumption of the engine, the engine rotational speed is lowered so as to set the predetermined load pressure P0 or the absorbing torque T0 of the hydraulic pump to points A1, A2, A3, and accordingly, the discharge rate of the hydraulic pump is decreased to a volume required for the work in order to aim at reducing the fuel consumption of the engine. However, since the above-mentioned points A1, A2, A3 are shifted outwardly from the center of equi-fuel consumption curves as denoted by B (the center gives 100%), the fuel consumption of the engine is deteriorated, and accordingly, it has been difficult to aim at reducing the fuel consumption of the engine. Further, the flow rate changing circuit as shown in FIG. 8 incurs the following problems: (1) Two pilot circuit selector valves 45, 46 have to be provided in the pilot circuit, and further, two pipe lines 54, 55 which are merged to the main circuit extending from the service valve 53 to the actuator 57 for the attachment, are required. Accordingly, the hydraulic circuit is complicated so as to lower the reliability of the hydraulic excavator and to incur an increase in manhours for inspection and maintenance and an increase in the manufacturing cost. (2) Since the flow rate of hydraulic oil fed to the actuator 57 for the attachment is given through the two stage change-over control for one or two pumps, a fine adjustment for the flow rate can not be made.

The present invention is devised in view of the above-mentioned problems inherent to the conventional arrangement, and accordingly, one object of the present invention is to set the volume of hydraulic oil to an optimum value by setting a low load mode so as to subject a hydraulic pump to load sensing control during a breaker work or the like where a smaller volume of hydraulic fluid is sufficient in comparison with a normal excavation work, and to drive an engine for driving the hydraulic pump at a rotational speed at which the fuel consumption is lowered.

SUMMARY OF THE INVENTION

According to the present invention, there is provided an arrangement comprising a variable displacement hydraulic pump, an engine for driving the hydraulic pump, an actuator operated by the hydraulic pump, a control valve disposed in pipe lines between the hydraulic pump and the actuator, a load sensing control device for the hydraulic pump, a working mode changeover device, and a controller receiving a change-over signal from the working mode change-over device and delivering a fuel injection volume signal to a governor drive device for the engine and a signal, for a pressure differential between the upstream and downstream sides of the control valve, to the load sensing control device. Accordingly, in the case of driving the actuator with a relatively smaller volume of hydraulic oil in a hydraulic excavator during a breaker work or the like, when the working mode change-over device is changed over into a low power mode, the controller delivers a low value fuel injection volume signal to the governor drive device for the engine so that the power of the engine is lowered, and further, a pressure differential signal, for increasing the differential pressure between the upstream and downstream sides of the actuator control valve, is delivered to the load sensing control device so that the volume of the variable displacement hydraulic pump is decreased with respect to a predetermined manipulation degree of the actuator control valve. Accordingly, the volume of the variable displacement hydraulic pump is decreased while the engine rotational speed with respect to a predetermined torque is lowered due to lowering of the engine power, and accordingly, the discharge rate of the variable displacement pump per unit time is decreased. Further, in the case of driving an actuator which requires a relative large volume of hydraulic oil during an excavation work or the like, when the working mode change-over device is changed over into a high power mode, the controller delivers a high value fuel injection volume signal to the governor drive device for the engine so as to increase the power of the engine while a pressure differential signal for decreasing the pressure differential between the upstream and downstream of the actuator control valve is delivered to the load sensing control device so as to increase the volume of the variable displacement hydraulic pump with respect to a predetermined manipulation degree of the actuator control valve. Thus, the volume of the variable displacement hydraulic pump is increased, and the engine rotational speed is raised with respect to a predetermined torque due to an increase in the power of the engine so that the discharge rate of the variable displacement hydraulic pump per unit time is increased. Further, the controller actuates a first engine fuel setting unit and a first load sensing pressure differential setting unit in response to a change-over signal from the working mode change-over device so as to cause the first engine fuel setting unit and the first load sensing pressure differential to deliver a first engine fuel setting signal and a first load sensing pressure differential signal to an engine fuel signal generator and a load sensing pressure differential signal generator, respectively, or the controller actuates a second engine fuel setting unit and a second load sensing pressure differential setting unit so as to cause the second engine fuel setting unit and the second load sensing pressure differential setting unit to deliver a second engine fuel setting signal and a second load sensing pressure differential setting signal to the engine fuel signal generator and the load sensing pressure differential signal generator, respectively, and accordingly, the engine fuel signal generator delivers an engine fuel injection volume signal to the governor drive device for the engine while the load sensing pressure differential signal generator delivers a load sensing pressure differential signal to the load sensing control device. Thus, when the controller receives a changeover signal from the working mode change-over device, the first engine fuel setting unit and the first load sensing pressure differential setting unit, or the second engine fuel setting unit and the second load sensing pressure differential setting unit, are operated by the change-over signal. When the first setting units are operated, the first engine fuel setting signal is delivered to the first engine fuel signal generator, and the first load sensing pressure differential setting signal is delivered to the first load sensing pressure differential signal generator. When the second setting units are operated, the second fuel setting signal is delivered to the second engine fuel signal generator, and the second load sensing pressure differential setting signal is delivered to the second load sensing differential signal generator. Accordingly, the engine fuel signal generator delivers a fuel injection volume signal to the governor drive device for the engine, and further, the load sensing pressure differential signal generator delivers a load sensing pressure differential signal to the load sensing control device. Further, either the first engine fuel setting unit and the first load sensing pressure differential setting unit or the second engine fuel setting unit and the second load sensing pressure differential setting unit can be eliminated from the controller, and instead, the engine fuel injection volume and the load sensing pressure differential of the load sensing control device are previously set. Thus, when the controller receives a change-over signal from the working mode changeover device, in a working mode relating to the eliminated setting units in the controller, the governor is driven so as to obtain the previously set fuel injection volume, and the load sensing control device exhibits the previously set load sensing pressure differential. In a working mode relating to the setting units which are not eliminated from the controller, the operation is performed, similar to the above-mentioned manner. Further, the load sensing control device is composed of a volume control cylinder for the hydraulic pump, and a load sensing control valve for feeding hydraulic pressure to the volume control cylinder. The load sensing control valve decreases the volume of the hydraulic pump in response to an increase in the pressure differential between the upstream and downstream sides of the control valve and increases the volume of the hydraulic pump in response to a decrease in the pressure differential between the upstream and downstream sides of the control valve. Further, the volume of the hydraulic pump is decreased in response to an increase in the load sensing pressure differential signal while the volume of the hydraulic pump is increased in response to a decrease in the load sensing pressure differential signal. Thus, since the pressure differential between the upstream and downstream sides of the control valve increases when the control valve is throttled in order to decelerate the actuator, the volume of the hydraulic pump is decreased so as to operate in such way that useless power is reduced. Further, since the pressure differential between the upstream and downstream sides of the control valve decreases when the opening degree of the control valve is increased in order to accelerate the actuator, the volume of the hydraulic pump is increased so as to feed a required flow rate. When the load sensing pressure differential signal is increased with respect to the one and the same manipulation degree of the control valve, the volume of the hydraulic pump is decreased so that the discharge rate of the hydraulic pump per unit time decreases, while when the load sensing pressure differential signal is decreased, the volume of the hydraulic pump is increased so that the discharge rate of the hydraulic pump per unit time increases. Further, there is provided an arrangement which is composed of a variable displacement hydraulic pump, an engine for driving the hydraulic pump, an actuator driven by the hydraulic pump, a control valve disposed in pipe lines between the hydraulic pump and the actuator, a load sensing control device for the hydraulic pump, a volume sensor for the hydraulic pump, a rotational speed sensor for the engine, a hydraulic pressure sensor for the actuator, a working mode change-over device, and a controller receiving signals from the volume sensor, the engine rotational speed sensor and the actuator hydraulic pressure sensor, and computing and delivering a control signal, for operating the engine at a minimum fuel consumption rate, to the load sensing control device and the governor drive device. Thus, in the case of driving an actuator for a breaker or the like which requires a relatively small flow rate of hydraulic oil in an excavator, when the control valve is operated by a manipulating lever which is separately incorporated, the volume of the variable displacement pump is controlled by the load sensing volume control device in accordance with an opening degree of the control valve. Further, since the load sensing control device for the variable displacement hydraulic pump is composed of a cylinder for driving a volume control device for the hydraulic pump and a load sensing valve using the hydraulic pressures of the upstream and downstream sides of the control valve disposed in the pipe lines between the hydraulic pump and the actuator as pilot pressures and adapted to be operated so as to reduce the volume of the hydraulic pump in response to an increase in the pressure differential between the pilot pressures and an increase in the control signal from the controller, when the controller receives signals from the volume sensor for the hydraulic pump, the engine rotational speed sensor, the actuator hydraulic pressure sensor and the working mode change-over device, the controller computes and delivers a control signal, with which the engine is operated at a minimum fuel consumption rate with a predetermined power designated by the working mode changeover device, to the load sensing volume control device and the engine governor drive device. Accordingly, in such a case that the engine is set so as to be operated at a minimum fuel consumption rate during a normal excavation work, even though the working mode is changed over into a breaker working mode (low power mode) or the like which requires a relatively small flow rate of hydraulic oil, the engine is operated under that power at a rotational speed with which the fuel consumption rate is minimum. Further, since the control signal, with which the engine is operated at a minimum fuel consumption rate, is set in accordance with an engine torque and an engine rotational speed which gives the minimum fuel consumption rate on the power curves of the engine and the like, the load sensing control device for the hydraulic pump uses the pressures of the upstream and downstream sides of the control valve as pilot pressures, and accordingly, the load sensing valve feeds a control pressure to the cylinder for driving the volume control device for the hydraulic pump so as to decrease the volume of the hydraulic pump when the pressure differential between the pilot pressures increases while the control signal from the controller increases. Further, the control signal, with which the engine is operated at a minimum consumption rate, is set by an engine torque and a engine rotational speed which give a minimum fuel consumption rate on the power curves of the engine and the like. Thus, according to the present invention, the change-over of the volume of hydraulic oil in accordance with a change-over of the working mode can be simply made by the change-over switch, and further, a plurality of working modes can be carried out by changing over the working mode. since the engine power can be set, independent from adjustment to the volume of the hydraulic pump, by adjusting the volume of the hydraulic pump through the load sensing control, a required flow rate can be ensured in any of the working modes, and the reduction of the fuel consumption for the engine can be attained. Accordingly, since the control valve can be controlled in a wide operating range, the manipulatability of the operator can be enhanced.

BRIEF DESCRIPTION OF THE DRAWINGS

FIGS. 1 and 2 are views illustrating a first embodiment of the present invention, in which FIG. 1 shows an entire control circuits in the first embodiment and FIG. 2 shows a detail of a controller shown in FIG. 1;

FIGS. 3 and 4 are views illustrating a second embodiment of the present invention, in which FIG. 3 shows an entire control circuit in the second embodiment, and FIG. 4 shows a detail of a controller shown in FIG. 3;

FIGS. 5 and 6 are views illustrating an embodiment common to the first and second embodiments, in which FIG. 5 shows equi-power curves and equi-fuel consumption curves on a plane of engine torque T vs. rotational speed N, and FIG. 6 shows equi-absorbing torque curves TB and TS depicted on a plane of hydraulic pump volume V vs. pressure P;

BEST MODES FOR CARRYING OUT THE INVENTION

Figure 1:
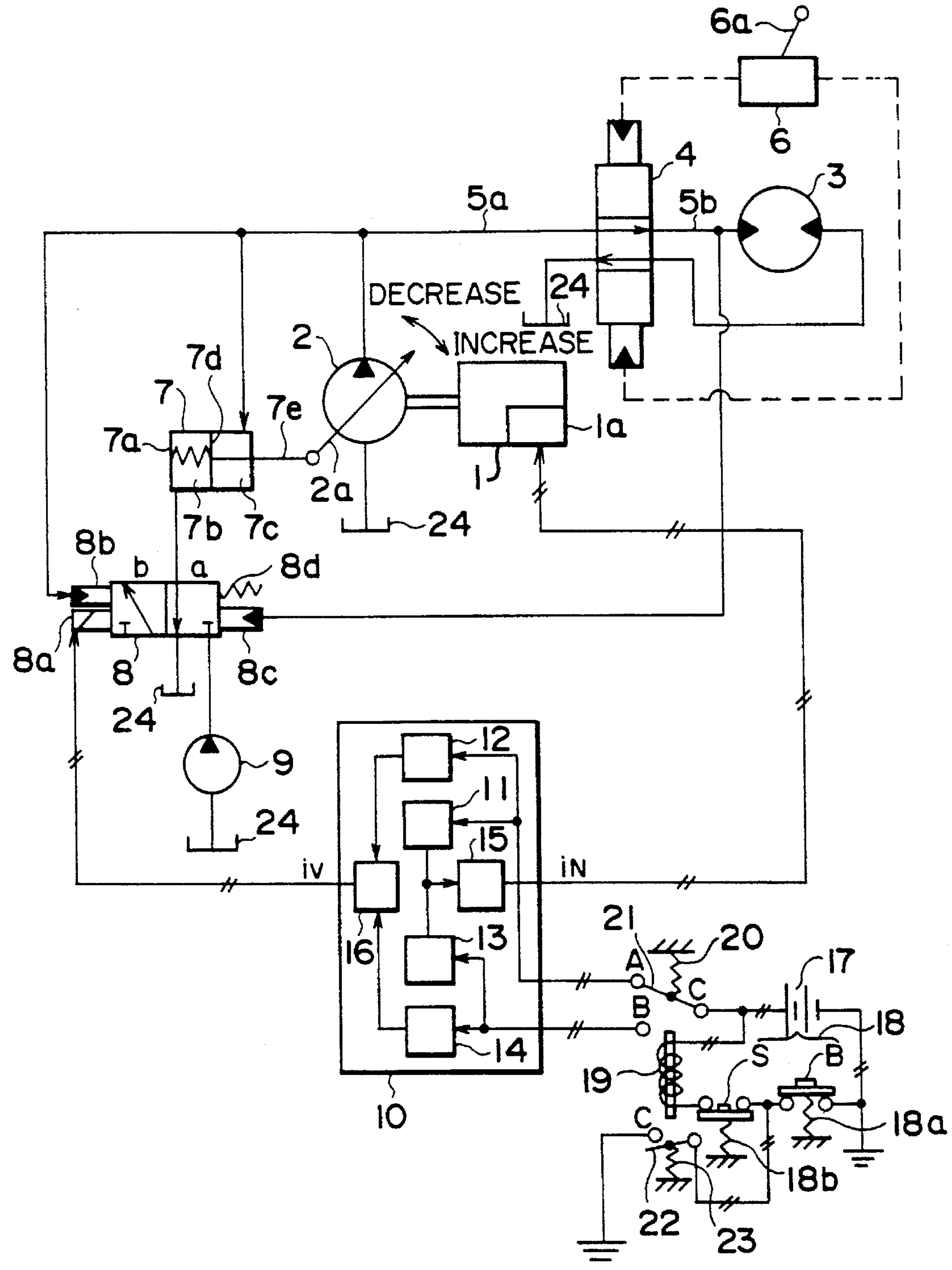
Figure 2:
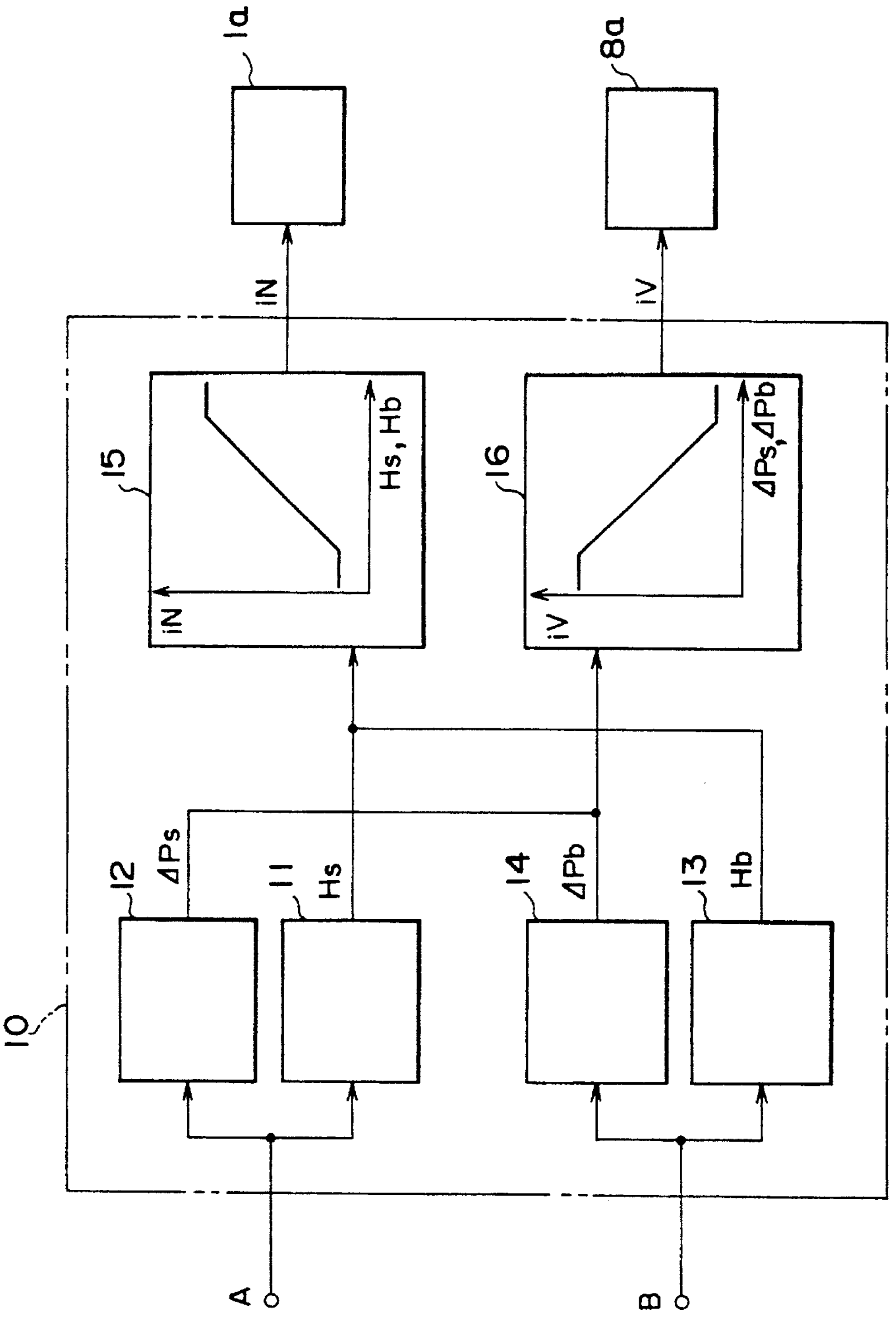
Figure 5:
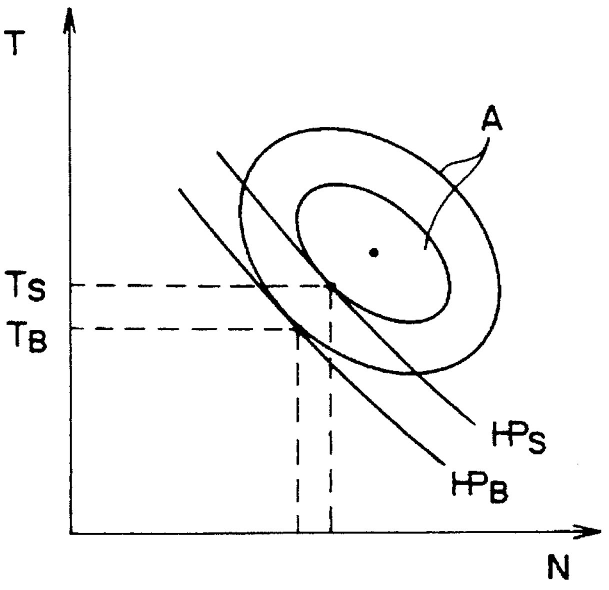
Figure 6:
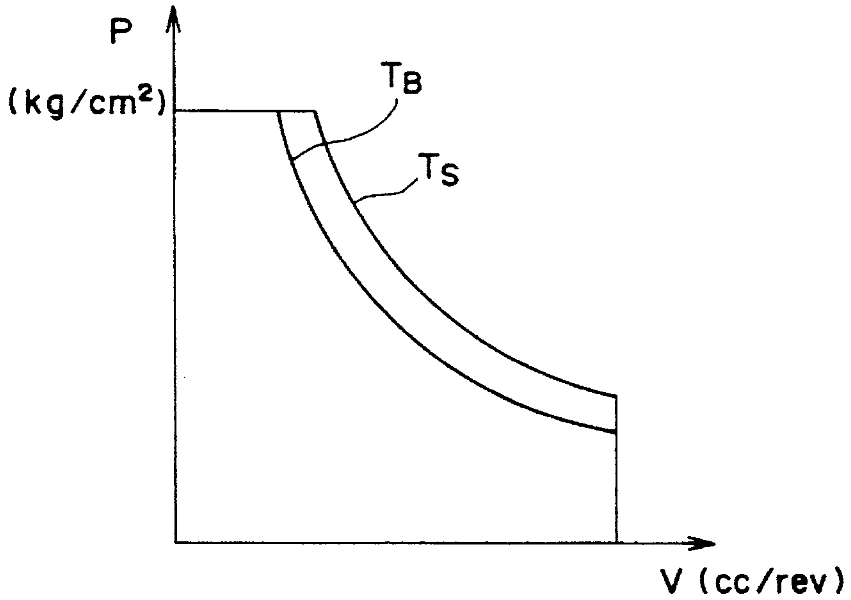
Figure 7:
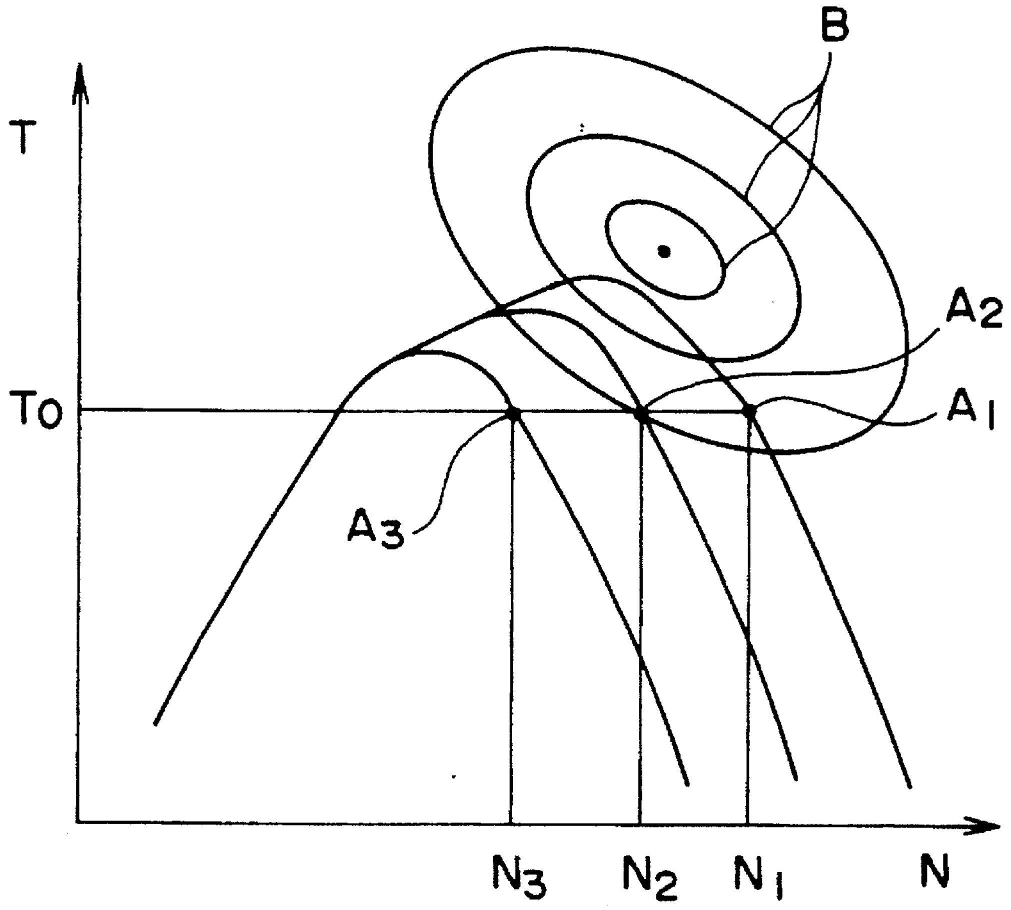
FIG. 7 (PRIOR ART)
FIG. 7 is a view showing adjustment to the hydraulic volume of a hydraulic pump in accordance with engine rotational speed in a conventional technology.
Figure 8:
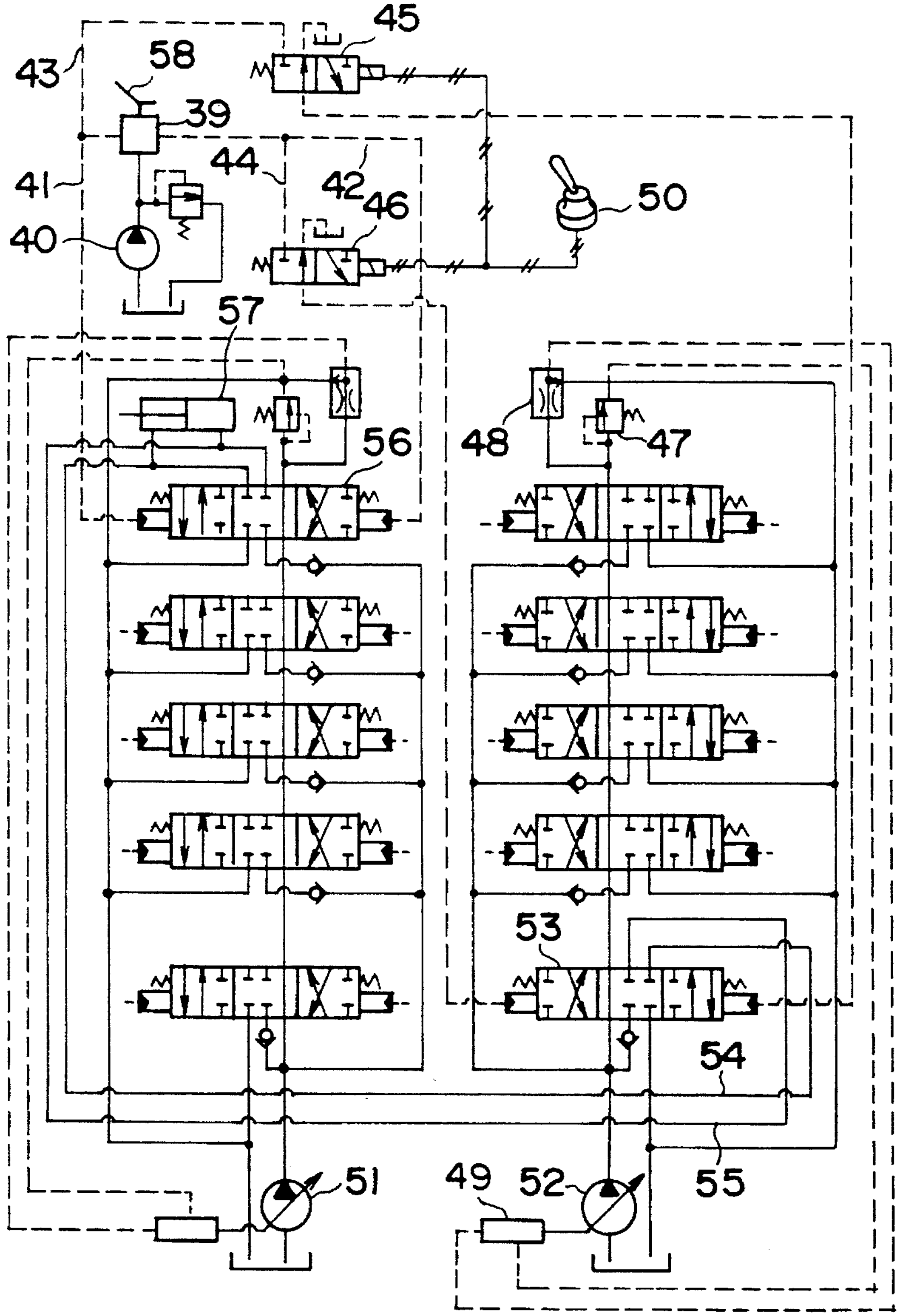
FIG. 8 (PRIOR ART)
FIG. 8 is a merging control circuit for a plurality of hydraulic pumps in a conventional technology.

Referring to FIGS. 1 and 2, which show a first embodiment of the present invention, there are shown an engine 1, a governor device **1*a* for the engine 1, a hydraulic pump 2 driven by the engine, a breaker 3, a breaker control valve 4 disposed in pipe lines 5*a*, 5*b* connecting the hydraulic pump 2 with the breaker 3, a breaker manipulating lever 6*a* for manipulating the breaker control valve 4, a pilot control valve 6 for generating a pilot pressure in accordance with a manipulation degree of the breaker manipulating lever 6*a*, a volume control cylinder 7 for driving a swash plate 2*a* in the hydraulic pump 2, a spring 7*a* disposed in a bottom chamber 7*b* in the volume control cylinder 7, for urging a piston 7*d* toward a rod chamber 7*c*, a piston rod 7*e* for coupling the piston 7*d* with the swash plate 2*a*, a load sensing valve 8 for changing over the control pressure of the volume control cylinder 7, a solenoid 8*a* of the load sensing valve 8** connected to a controller 10, a pilot cylinder 8*b* of the load sensing valve 8 connected to the pipe line 5*a* upstream of the control valve 4, a pilot cylinder 8*c* of the load sensing valve 8 connected to the pipe line 5*b* downstream of the control valve 4, a pressure differential setting spring 8*d* in the load sensing valve 8, a control pump 9 as a control pressure source for the volume control cylinder 7, the controller 10 receiving a change-over signal from a working mode change-over device 17–23 and delivering a fuel injection volume signal $i_N$ to the governor drive device 1*a* for the engine 1 and a signal indicating a pressure differential between the upstream and downstream sides of the control valve, to the solenoid 8*a* of the load sensing valve 8 in the load sensing control device, the controller 10 being composed of engine fuel setting units 11, 13, load sensing pressure differential setting units, 12, 14, an engine fuel signal generator 15 and a load sensing pressure differential signal generator 16. The working mode change-over device 17 through 23 comprises a power source 17, a working mode change-over button assembly 18 composed of an excavation mode (normal excavation mode, high power mode) button S, a breaker mode (low power mode) button B and return springs 18*a*, 18*b*, a solenoid 19, a spring 20, a working mode switch 21, a self-hold switch 22, and a spring 23. As shown in FIG. 1, a hydraulic fluid reservoir tank 24 supplies hydraulic fluid to pumps 2 and 9 and receives hydraulic fluid from the drain lines. Referring to FIG. 5 which shows equi-power curves, equi-fuel consumption curves on a plane of engine torque T vs. rotational speed N, there are shown equi-fuel consumption curves A having its center at which the fuel consumption rate is 100%, an equi-power curve HPS in an excavation mode, an equi-power curve HPB in a breaker mode and engine torques TS, TB at tangent points of the equi-power curves to the equifuel consumption curves A. Further, referring to FIG. 6 which shows equi-absorbing torque curves TB, TS which are depicted on a plane of hydraulic pump volume V vs. pressure P, the curves TS, TB correspond to TS, TB shown in FIG. 5. The operation of the arrangement shown in FIGS. 1 and 2 will be explained. In such a case that the hydraulic excavator is to be operated in a normal excavation mode (high power mode), the excavation mode button S on the working mode change-over button assembly 18 is depressed, a solenoid 19 is deenergized since no voltage is applied to the solenoid 19 from the power source 17, and accordingly, the working mode change-over switch 21 is moved into contact with a contact A by means of the spring 20. Accordingly, a voltage is applied to the engine fuel setting unit 11 and the load sensing pressure differential setting unit 12 in the controller 10, from the power source 17, and therefore, a high value engine fuel setting signal Hs set in the engine fuel setting unit 11 is delivered to the engine fuel signal generator 15 while a high value load sensing pressure differential setting signal set in the load sensing pressure differential setting unit 12 is delivered to the pressure differential signal generator 16. The engine fuel signal generator 15 is an increasing function generator, and since an engine fuel signal iN corresponding to the high value engine fuel signal setting signal Hs is delivered to the governor drive device 1*a* for the engine 1 from the controller 10, the power of the engine is increased. Further, the load sensing pressure differential signal generator 16 is a decreasing function generator, and accordingly, when a low value load sensing pressure differential signal iV corresponding to the high value load sensing pressure differential setting signal ΔPs is delivered to the solenoid 8*a* of the load sensing valve 8 from the controller 10, the load sensing valve 8 is shifted toward a position (a) so as to drain hydraulic oil from the bottom chamber 7*b* of the volume control cylinder 7, resulting in an increase in the volume of the hydraulic pump 2. As mentioned above, since the excavator is operated at a high engine rotational speed with a large hydraulic pump volume, the discharge rate of the hydraulic pump per unit time is increased, and accordingly, actuators can be operated at a high speed, thereby it is possible to enhance the working efficiency. Next, in such a case that the breaker is driven with a relatively small volume of hydraulic oil (low power mode), when the breaker mode button B in the working mode change-over button assembly 18 is depressed, a voltage is applied to the solenoid 19 from the power source 17 so that the solenoid 19 is energized, and accordingly even though the breaker mode button B is released, the self-hold switch 22 is held at a contact C so that the solenoid 19 holds its energization, resulting in the working mode changeover switch 21 being held to make contact with the contact B, overcoming the spring 20. Accordingly, since the voltage from the power source 17 is continuously applied to the engine fuel setting unit 13 and the load sensing pressure differential setting unit 14 in the controller 10, a low value engine fuel setting signal Hb set in the engine fuel setting unit 13 is delivered to the engine fuel signal generator 15 while a low value load sensing pressure differential setting signal ΔPb set in the load sensing differential pressure unit 14 is delivered to a differential signal generator 16. As mentioned above, the engine fuel signal generator 15 is an increasing function generator, and accordingly, an engine fuel signal iN corresponding to the low value engine fuel setting signal Hb is delivered to the governor drive device 1*a* for the engine 1 from the controller 10 so that the engine power is lowered. Further, since the load sensing pressure differential signal generator 16 is a decreasing function generator, when a high value load sensing pressure differential signal iV corresponding to the low value load sensing pressure differential setting signal ΔPb is delivered to the solenoid 8*a* of the load sensing valve 8, the load sensing valve 8 is shifted toward a position b so that hydraulic oil is fed into the bottom chamber 7*b* of the volume control cylinder 7 from the control pump 9, and the volume of the hydraulic pressure pump 2 is decreased. As mentioned above, since the excavator is operated at a low engine rotational speed with a small hydraulic pump volume in the breaker mode, the discharge rate of the hydraulic pump per unit time can be decreased. It is noted that either the first engine fuel setting unit 11 and the first load sensing pressure differential setting unit 12 or the second engine fuel setting unit 13 and the second load sensing pressure differential setting unit 14 can be eliminated, and instead, an engine fuel injection volume for the engine 1 and a load sensing pressure differential for the load sensing control device can be previously set. In the case of elimination of either the setting units 11, 12 or the setting units 13, 14, when a change-over signal from the working mode change-over device is delivered, the operation is made, similar to the above-mentioned embodiment, in the working mode in which the setting units are not eliminated. However, in the working mode in which the setting units are eliminated, the governor is driven so that the engine fuel injection volume reaches the predetermined set value, and further, the load sensing control device is also set to the previously set load sensing pressure differential.

Figure 3:
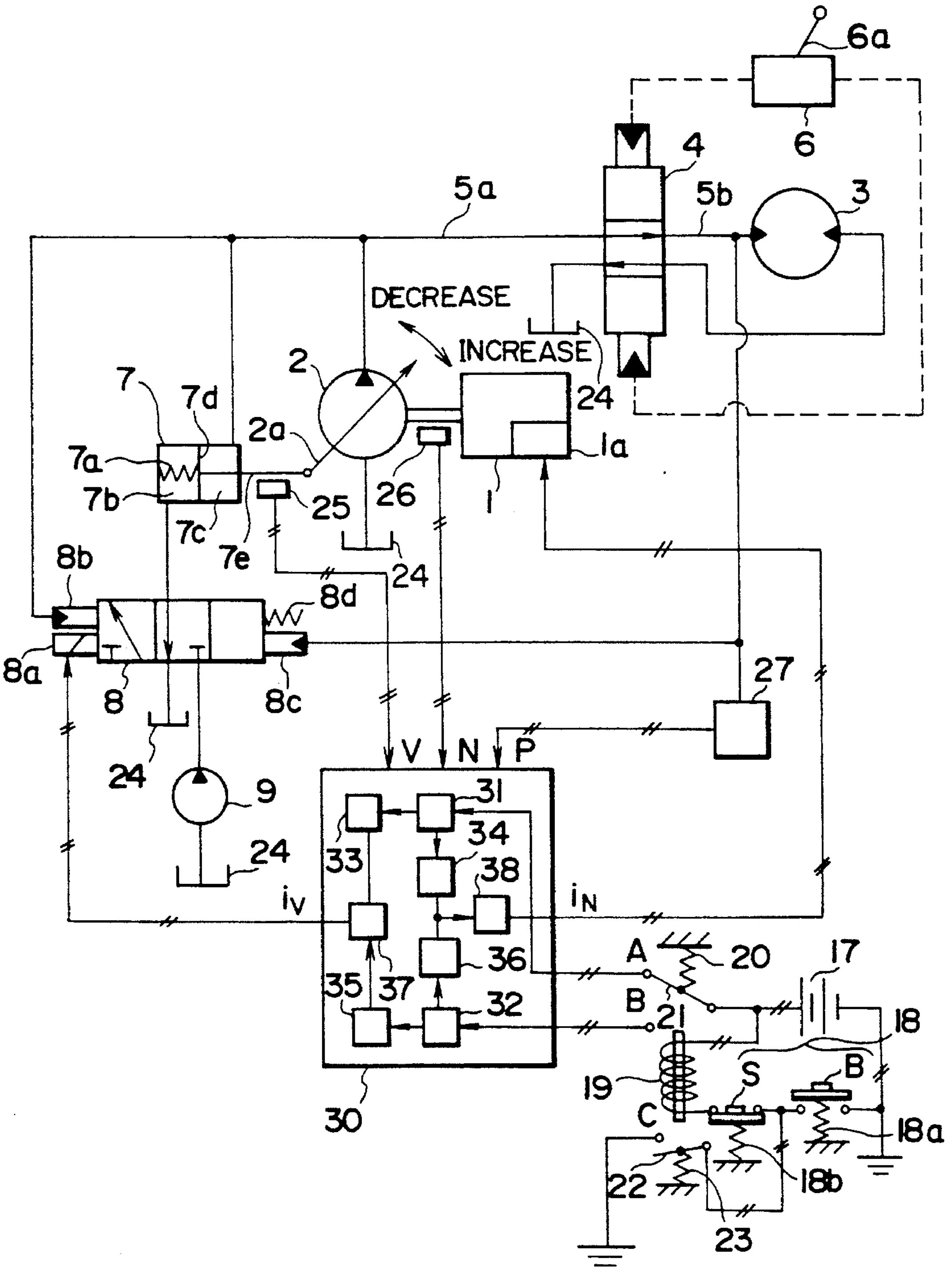
Figure 4:
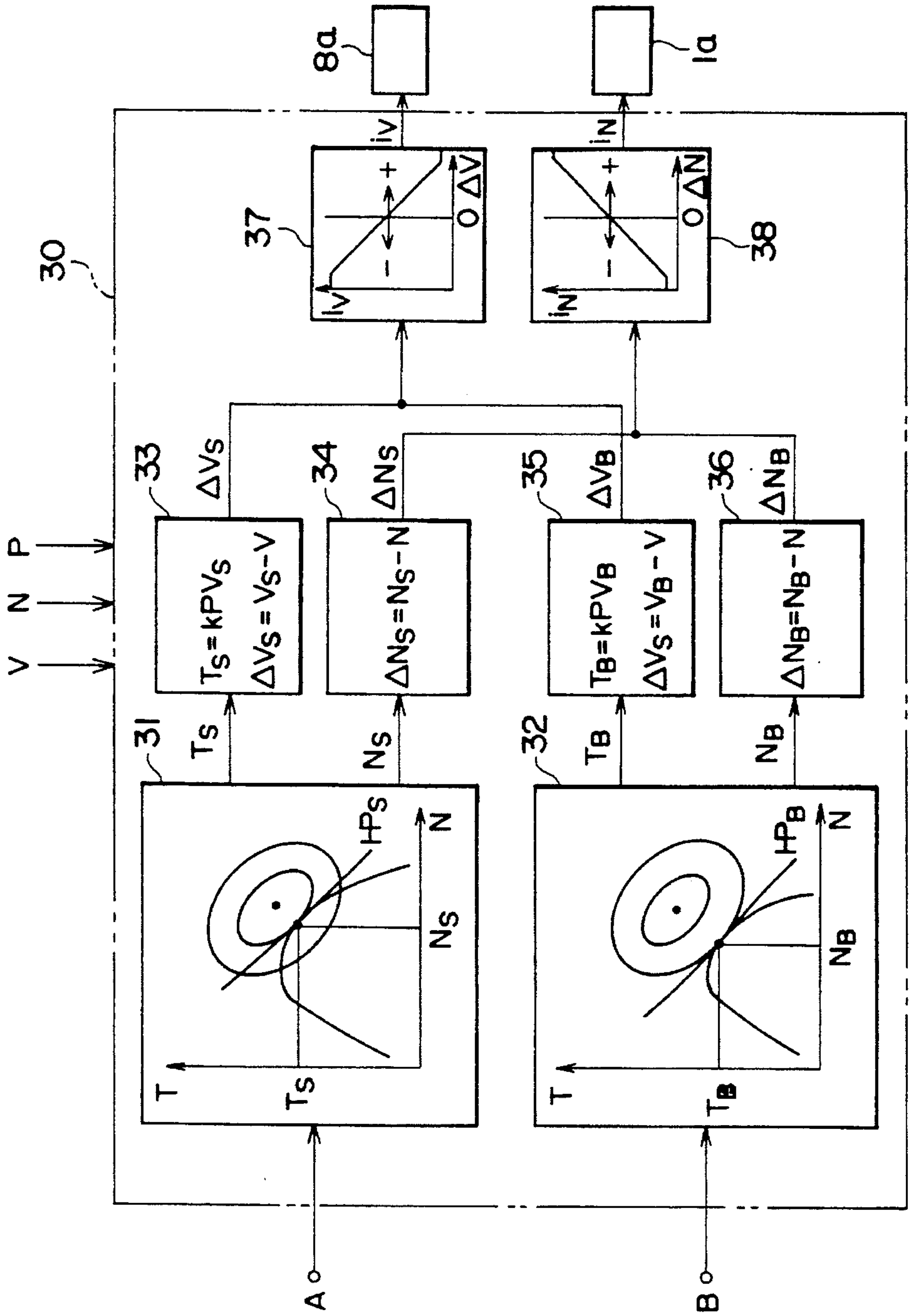

Referring to FIGS. 3 and 4, which show a second embodiment of the present invention, there are shown an engine 1, a hydraulic pump 2 driven by the engine 1, a breaker 3, a breaker control valve 4 disposed in pipe lines 5*a*, 5*b* connecting the hydraulic pump 2 to the breaker 3, a breaker manipulating lever 6*a* for manipulating the breaker control valve 4, a pilot control valve 6 for generating a pilot pressure corresponding to a manipulation degree of the breaker manipulating lever 6a, a volume control cylinder 7 for driving a swash plate 2a in the hydraulic pump 2, a load sensing valve 8 for changing a control pressure to the volume control cylinder 7, a control pump 9 as a control pressure valve for the volume control cylinder 7, a hydraulic pressure sensor 27 for electrically converting a hydraulic pressure on the side 5b downstream side of the control valve 4, a working mode change-over switch 18 for a hydraulic excavator, comprising an excavation mode button S and a breaker mode button B, a pump volume sensor 25 for detecting a volume of the hydraulic pump 2, an engine rotational speed sensor 26 for detecting a rotational speed of the engine 1, a controller 30 receiving detection signals and an instruction signal from the hydraulic pressure sensor 27 for the actuator 3, the working mode change-over switch 18, the pump volume sensor 25 for the hydraulic pump 2, and the engine rotational speed sensor 26 for the engine 1, for computing control signals iN, iV with which the engine is operated at a minimum fuel consumption rate under a predetermined power designated by the working mode change-over switch 18 so as to deliver the control signals iN, iV to a governor drive device 1a for the engine 1 and the solenoid 8a of the load sensing valve 8, respectively, a pilot cylinder 8b of the load sensing valve 8 connected to the pipe line 5a upstream of the control valve 4, a pilot cylinder 8c of the load sensing valve 8 connected to the pipe line 5b downstream of the control valve 4, a pressure differential setting spring 8d of the load sensing valve 8, a spring 7a disposed in a bottom chamber 7b of the volume control cylinder 7, for urging a piston 7d toward a rod chamber 7c, a piston rod 7e coupling a piston 7d to the swash plate 2a, and a hydraulic oil tank 24. Further, there are shown a power source 17, a solenoid 19, a change-over switch 21, a spring 20, a hold switch 22, and a spring 23. Referring to FIG. 4, there are shown the governor drive device 1a, the solenoid 8a of the load sensing valve 8, the controller 30 which comprises a desired value setting unit 31 for setting a desired engine rotational speed NS, and a desired engine torque TS for the excavation mode (high power mode), a volume difference calculator 33 for calculating a difference ΔVS between a desired volume VS, that is calculated from the desired engine torque TS and a value P detected by the hydraulic pressure sensor 27, and a value V detected by the volume sensor 25, and an engine rotational speed difference calculator 34 for calculating a difference ΔNS between the desired engine rotational speed NS and an actual engine rotational speed N detected by the engine rotational speed sensor 26, and which also comprises, for the breaker mode (low power mode), a desired value setting unit 32 for setting a set engine rotational speed NB and a set engine torque TB for the breaker mode, a volume difference calculator 35 for calculating a difference ΔVB between a desired volume VB, that is calculated from the desired engine torque TB and a value P detected by the hydraulic pressure sensor 27, and a value V detected by the volume sensor 25, an engine rotational speed difference calculator 36 for calculating a difference ΔNB between the desired rotational speed NB and an actual engine rotational speed N detected by the engine rotational speed sensor 26, a control signal generator 37 for converting the volume difference signal ΔVS or ΔVB into the control signal iV adapted to be applied to the solenoid 8a, and a control signal generator 38 for converting the engine rotational speed difference signal ΔNS or ΔNB into the control signal iN adapted to be applied to the governor drive device 1a.

Next, explanation will be made of the operation of the arrangement shown in FIGS. 3 and 4. In the case of operating the hydraulic excavator in a normal excavation mode (high power mode), when the excavation mode button S of the mode change-over switch 8 is depressed, the solenoid 19 is deenergized since no voltage is applied to the solenoid 19 from the power source 17, and accordingly, the switch 21 is connected to the contact A by means of the spring 20. Accordingly, the desired value setting unit 31 in the controller 30 sets a desired engine rotational speed NS and a desired engine torque TS, and the desired engine torque TS and a value P detected by the hydraulic sensor 27 are delivered to the volume difference calculator 33. As well-known, there can be exhibited TS=kP*VS where k is a proportional constant, and accordingly, the desired pump volume VS can be calculated, and a difference ΔVS between the desired pump volume VS and a value V detected by the pump volume sensor 25 is calculated. When the volume difference ΔVS signal is delivered to the control signal generator 37, a control signal iV corresponding to the volume difference signal ΔVS as shown is delivered to the solenoid 8a of the load sensing device 8. Since the control signal generator 37 is set in such a way that the smaller the volume difference signal ΔVS, the larger the control signal iV becomes, if the actual pump volume V detected by the pump volume sensor 25 is excessively large with respect to the desired volume pump volume VS, the volume difference signal ΔVS becomes small so that the control signal iV become large, and accordingly, the urging force of the solenoid 8a which pushes the load sensing valve 8 rightwardly becomes large. Thus, a control pressure is fed from the control pump 9 into the bottom chamber 7b of the volume control cylinder 7, and accordingly, the piston rod 7e of the volume control cylinder 7 is moved rightwardly to control the swash plate 2a of the variable displacement hydraulic pump 2 in a direction in which the volume is decreased. Thus, control is made such that the volume difference signal ΔVS becomes zero, that is, the actual volume V becomes equal to the desired pump volume VS. Similarly, when the desired engine rotational speed NS set by the desired value setting unit 31 and an actual engine rotational speed N detected by the engine rotational sensor N are delivered to the engine rotational speed difference calculator 34, a difference ΔNS between the desired engine rotational speed NS and the actual engine rotational speed N detected by the engine rotational speed sensor 26 is calculated. Since the control signal generator 38 is set in such a way that the smaller the engine rotational difference signal ΔNS, the smaller the control signal iN becomes, if, for example, the actual engine rotational speed N detected by the engine rotational speed sensor 26 is excessively small, the engine rotational speed difference signal ΔNS is large so that the control signal iN becomes large, and accordingly, the governor drive device is largely shifted so that a large volume of fuel is injected to increase the engine rotational speed N. Thus, the engine rotational speed difference signal ΔNS becomes zero, that is, control is made such that the actual engine rotational speed N becomes equal to the desired engine rotational speed NS, and accordingly, the excavation work can be performed at a desired engine rotational speed NS at which the fuel consumption of the engine is minimum, with the desired engine torque TS. In the case of the operation in the breaker mode (low power mode), in which the volume of hydraulic oil used is about 50% of that of the normal excavation work, when breaker mode button B of the mode change-over switch 18 is depressed, a voltage is applied to the solenoid 19 from the power source 17, and the changeover switch 21 is moved to contact B, overcoming the spring 20 while the hold switch 22 is moved to contact C so that the breaker mode is held by the hold switch 22 even though the manual depression of the breaker mode switch B is released, and accordingly, a power source voltage is applied to the desired value setting unit 32 in the controller 30. Thus, a desired engine rotational speed NB and a desired engine torque TB are set by the desired value setting unit 32, and thereby the breaker work can be carried out at the desired engine rotational speed NB at which the fuel consumption is minimum, with the desired engine torque TB, similar to the above-mentioned normal excavation work.

INDUSTRIAL APPLICABILITY

The present invention relates to a hydraulic oil volume change-over control apparatus characterized in that, in the case of a breaker work or the like in which a hydraulic breaker as an attachment is attached, instead of a bucket which is usually attached as a working unit, to a hydraulic excavator so as to crush a building or a rock block and so forth, thereby requiring a volume of hydraulic oil which is less than that during a normal excavation mode or the like, the hydraulic pump is subjected to load sensing control by setting a low power mode, so as to set the volume of hydraulic oil to an optimum value, and further, the engine for driving the hydraulic pump is operated at a rotational speed at which the fuel consumption of the engine becomes low.

What is claimed is:

1. A hydraulic oil volume change-over control apparatus for a hydraulic excavator comprising:

a variable displacement hydraulic pump;

an engine for driving said hydraulic pump;

a governor drive device for said engine;

an actuator;

pipe lines connected between said hydraulic pump and said actuator so that said actuator can be driven by said hydraulic pump;

an actuator control valve disposed in said pipe lines between said hydraulic pump and said actuator, and having an upstream side and a downstream side;

a load sensing control device for said hydraulic pump;

a working mode change-over device for establishing a change-over signal representative of the selection for said actuator of one of a low power mode and a high power mode;

a controller receiving said change-over signal from said working mode change-over device, for delivering to said governor drive device an engine fuel injection volume signal, and for delivering to said load sensing control device a load sensing pressure differential signal for changing the volume of said variable displacement hydraulic pump and thereby changing a pressure differential between said upstream and downstream sides of said actuator control valve;

a first engine fuel setting unit;

a first load sensing pressure differential setting unit;

a second engine fuel setting unit;

a second load sensing pressure differential setting unit;

an engine fuel signal generator; and a load sensing pressure differential signal generator;

wherein said controller (a) energizes said first engine fuel setting unit and said first load sensing pressure differential setting unit in accordance with a change-over signal from said working mode change-over device representative of the selection of said high power mode so that a first engine fuel setting signal is delivered to said engine fuel signal generator from said first engine fuel setting unit while a first load sensing pressure differential setting signal is delivered to said load sensing pressure differential signal generator from said first load sensing pressure differential setting unit, and (b) energizes said second engine fuel setting unit and said second load sensing pressure differential setting unit in accordance with a change-over signal from said working mode change-over device representative of the selection of said low power mode so that a second engine fuel setting signal is delivered to said engine fuel signal generator from said second engine fuel setting unit while a second load sensing pressure differential setting signal is delivered to said load sensing pressure differential signal generator from said second load sensing pressure differential setting unit, whereby an engine fuel injection volume signal is delivered to said governor drive device for the engine from said engine fuel signal generator while a load sensing pressure differential signal is delivered to said load sensing control device from said load sensing pressure differential signal generator.

2. A hydraulic oil volume change-over control apparatus in accordance with claim 1, wherein said working mode change-over device comprises a power source, a high power mode button, a low power mode button, and a working mode switch connected to said power source, said working mode switch being adapted to move to a high power mode position upon actuation of said high power mode button and to move to a low power mode position upon actuation of said low power button, whereby a change-over signal representative of the selection of the high power mode is applied to said controller when said high power mode button is actuated, and whereby a change-over signal representative of the selection of the low power mode is applied to said controller when said low power mode button is actuated.

3. A hydraulic oil volume change-over control apparatus for a hydraulic excavator in accordance with claim 1, wherein said load sensing control device comprises a volume control cylinder for said hydraulic pump, and a load sensing control valve for feeding hydraulic pressure to said volume control cylinder; and wherein said load sensing control valve is adapted to decrease the volume of said hydraulic pump in response to an increase in pressure differential between the upstream and downstream sides of said actuator control valve, increase the volume of said hydraulic pump in response to a decrease in pressure differential between the upstream and downstream sides of said actuator control valve, decrease the volume of said hydraulic pump in response to an increase in said load sensing pressure differential signal, and increase the volume of said hydraulic pump in response to a decrease in said load sensing pressure differential signal.

4. A hydraulic oil volume change-over control apparatus in accordance with claim 1, further comprising:

an actuator manipulating lever, a pilot control valve for generating a pilot pressure in accordance with the manipulation degree of the actuator manipulating lever and for applying said pilot pressure to said actuator control valve so as to manipulate said actuator control valve responsive to the manipulation of said actuator manipulating lever;

wherein said working mode change-over device comprises a power source, a high power mode button, a low power mode button, and a working mode switch connected to said power source, said working mode switch being adapted to move to a high power mode position upon actuation of said high power mode button and to move to a low power mode position upon actuation of said low power button, whereby a change-over signal representative of the selection of the high power mode is applied to said controller when said high power mode button is actuated, and whereby a change-over signal representative of the selection of the low power mode is applied to said controller when said low power mode button is actuated; and wherein said load sensing control device comprises a volume control cylinder for said hydraulic pump, and a load sensing control valve for feeding hydraulic pressure to said volume control cylinder; and wherein said load sensing control valve is adapted to decrease the volume of said hydraulic pump in response to an increase in pressure differential between the upstream and downstream sides of said actuator control valve, increase the volume of said hydraulic pump in response to a decrease in pressure differential between the upstream and downstream sides of said actuator control valve, decrease the volume of said hydraulic pump in response to an increase in said load sensing pressure differential signal, and increase the volume of said hydraulic pump in response to a decrease in said load sensing pressure differential signal.

5. A hydraulic oil volume change-over control apparatus for a hydraulic excavator, said apparatus comprising:

a variable displacement hydraulic pump;

an engine for driving said hydraulic pump;

a governor drive device for said engine;

an actuator;

pipe lines connected between said hydraulic pump and said actuator so that said actuator can be driven by said hydraulic pump;

an actuator control valve disposed in said pipe lines between said hydraulic pump and said actuator, and having an upstream side and a downstream side;

a load sensing control device for said hydraulic pump, said load sensing control device having a first pilot cylinder and a second pilot cylinder, said first pilot cylinder being connected to said upstream side of said actuator control valve, said second pilot cylinder being connected to said downstream side of said actuator control valve;

a working mode change-over device for establishing a change-over signal representative of the selection for said actuator of one of a low power mode and a high power mode;

an engine fuel setting unit;

a load sensing pressure differential setting unit;

an engine fuel signal generator;

a load sensing pressure differential signal generator;

means for setting a predetermined engine fuel injection volume for said engine;

means for setting a predetermined load sensing pressure differential for the load sensing control device; and a controller receiving said change-over signal from said working mode change-over device, for delivering to said governor drive device an engine fuel injection volume signal, and for delivering to said load sensing control device a load sensing pressure differential signal for changing the volume of said variable displacement hydraULic pump and thereby changing a pressure differential between said upstream and downstream sides of said actuator control valve, wherein said controller either (a) energizes said engine fuel setting unit and said load sensing pressure differential setting unit in accordance with a change-over signal from said working mode change-over device so that a first engine fuel setting signal is delivered to said engine fuel signal generator from said first engine fuel setting unit while a first load sensing pressure differential setting signal is delivered to said load sensing pressure differential signal generator from said first load sensing pressure differential setting unit, or (b) utilizes said means for setting a predetermined engine fuel injection volume for said engine and said means for setting a predetermined load sensing pressure differential for the load sensing control device so that a second engine fuel setting signal is delivered to said engine fuel signal generator from said means for setting a predetermined engine fuel injection volume for said engine while a second load sensing pressure differential setting signal is delivered to said load sensing pressure differential signal generator from said means for setting a predetermined load sensing pressure differential for the load sensing control device, whereby an engine fuel injection volume signal is delivered to said governor drive device for the engine from said engine fuel signal generator while a load sensing pressure differential signal is delivered to said load sensing control device from said load sensing pressure differential signal generator.

6. A hydraulic oil volume change-over control apparatus for a hydraulic excavator in accordance with claim 5, wherein said load sensing control device comprises a volume control cylinder for said hydraulic pump, and a load sensing control valve for feeding hydraulic pressure to said volume control cylinder; and wherein said load sensing control valve is adapted to decrease the volume of said hydraulic pump in response to an increase in pressure differential between the upstream and downstream sides of said actuator control valve, increase the volume of said hydraulic pump in response to a decrease in pressure differential between the upstream and downstream sides of said actuator control valve, decrease the volume of said hydraulic pump in response to an increase in said load sensing pressure differential signal, and increase the volume of said hydraulic pump in response to a decrease in said load sensing pressure differential signal.

7. A hydraulic oil volume change-over control apparatus for a hydraulic excavator, comprising:

a variable displacement hydraulic pump;

an engine for driving said hydraulic pump;

a governor drive device for said engine;

an actuator;

pipe lines connected between said hydraulic pump and said actuator so that said actuator can be driven by said hydraulic pump;

an actuator control valve disposed in said pipe lines between said hydraulic pump and said actuator, and having an upstream side and a downstream side;

a load sensing control device for said hydraulic pump;

a working mode change-over device for establishing a chanqe-over signal representative of the selection for said actuator of one of a low power mode and a high power mode;

a controller receiving said change-over signal from said working mode change-over device; for delivering to said governor drive device an engine fuel injection volume signal, and for delivering to said load sensing control device a load sensing pressure differential signal for changing the volume of said variable displacement hydraulic pump and thereby changing a pressure differential between said upstream and downstream sides of said actuator control valve;

a volume sensor for said hydraulic pump; and a hydraulic pressure sensor for said actuator; and wherein said controller utilizes signals from said volume sensor and said hydraulic pressure sensor to compute said load sensing pressure differential signal for operating said engine at a minimum fuel consumption rate under a power designated by said change-over signal from said working mode change-over device.

8. A hydraulic oil volume change-over control apparatus for a hydraulic excavator in accordance with claim 7, further comprising:

a rotational speed sensor for said engine; and wherein said controller utilizes a signal from said rotational speed sensor to compute said engine fuel injection volume signal for operating said engine at a minimum fuel consumption rate under a power designated by said change-over signal from said working mode change-over device.

9. A hydraulic oil volume change-over control apparatus for a hydraulic excavator in accordance with claim 8, wherein said load sensing control device for said variable displacement pump comprises a volume control cylinder for said hydraulic pump, and a load sensing valve using as opposing pilot pressures the hydraulic pressures upstream and downstream of said actuator control valve disposed in said pipe lines between said hydraulic pump and said actuator; wherein said load sensing control device is adapted to decrease the volume of said hydraulic pump when a pressure differential between said pilot pressures increases and when said load sensing pressure differential signal increases.

10. A hydraulic oil volume change-over control apparatus for a hydraulic excavator in accordance with claim 9, wherein said load sensing control device is adapted to increase the volume of said hydraulic pump when a pressure differential between said pilot pressures decreases and when said load sensing pressure differential signal decreases.

11. A hydraulic oil volume change-over control apparatus in accordance with claim 10, wherein said engine fuel injection volume signal, by which said engine is operated at a minimum fuel consumption rate, is set in accordance with an engine torque and an engine rotational speed which are obtained on engine equi-power curves at points where the fuel consumption rate is minimum.

12. A hydraulic oil volume change-over control apparatus in accordance with claim 8, wherein said controller comprises:

a desired value setting unit for setting a desired engine rotational speed and a desired engine torque for the high power mode;

a volume difference calculator for calculating a difference between (a) a desired high mode volume that is calculated from a set desired engine torque for the high power mode and a value detected by said hydraulic pressure sensor and (b) a value detected by said volume sensor, and producing a volume difference signal responsive to the thus calculated difference;

an engine rotational speed difference calculator for calculating a difference between a set desired engine rotational speed for the high power mode and an actual engine rotational speed detected by said engine rotational speed sensor, and producing an engine rotational speed difference signal responsive to the thus calculated difference;

a desired value setting unit for setting a set engine rotational speed and a set engine torque for the low power mode;

a volume difference calculator for calculating a difference between (a) a desired low mode volume that is calculated from a set desired engine torque for the low power mode and a value detected by said hydraulic pressure sensor and (b) a value detected by said volume sensor, and producing a volume difference signal responsive to the thus calculated difference;

an engine rotational speed difference calculator for calculating a difference between a set desired engine rotational speed for the low power mode and an actual engine rotational speed detected by said engine rotational speed sensor, and producing an engine rotational speed difference signal responsive to the thus calculated difference;

a control signal generator for converting a volume difference signal into said load sensing pressure differential signal to be delivered to said load sensing control device; and a control signal generator for converting an engine rotational speed difference signal into said engine fuel injection volume signal to be delivered to said governor drive device.

13. A hydraulic oil volume change-over control apparatus in accordance with claim 12, further comprising an actuator manipulating lever, a pilot control valve for generating a pilot pressure in accordance with the manipulation degree of the actuator manipulating lever and for applying said pilot pressure to said actuator control valve so as to manipulate said actuator control valve responsive to the manipulation of said actuator manipulating lever.

14. A hydraulic oil volume change-over control apparatus in accordance with claim 13, wherein said working mode change-over device comprises a power source, a high power mode button, a low power mode button, and a working mode switch connected to said power source, said working mode switch being adapted to move to a high power mode position upon actuation of said high power mode button and to move to a low power mode position upon actuation of said low power button, whereby a change-over signal representative of the selection of the high power mode is applied to said controller when said high power mode button is actuated, and whereby a change-over signal representative of the selection of the low power mode is applied to said controller when said low power mode button is actuated.

15. A hydraulic oil volume change-over control apparatus for a hydraulic excavator in accordance with claim 14, wherein said load sensing control device comprises a volume control cylinder for said hydraulic pump, and a load sensing control valve for feeding hydraulic pressure to said volume control cylinder; and wherein said load sensing control valve is adapted to decrease the volume of said hydraulic pump in response to an increase in pressure differential between the upstream and downstream sides of said actuator control valve, increase the volume of said hydraulic pump in response to a decrease in pressure differential between the upstream and downstream sides of said actuator control valve, decrease the volume of said hydraulic pump in response to an increase in said load sensing pressure differential signal, and increase the volume of said hydraulic pump in response to a decrease in said load sensing pressure differential signal.

16. A hydraulic oil volume change-over control apparatus for a hydraulic excavator, comprising:

a variable displacement hydraulic pump;

an engine for driving said hydraulic pump;

a governor drive device for said engine;

an actuator;

pipe lines connected between said hydraulic pump and said actuator so that said actuator can be driven by said hydraulic pump;

an actuator control valve disposed in said pipe lines between said hydraulic pump and said actuator, and having an upstream side and a downstream side;

a load sensing control device for said hydraulic pump;

a working mode change-over device for establishing a change-over signal representative of the selection for said actuator of one of a low power mode and a high power mode;

a controller receiving said change-over signal from said working mode change-over device, for delivering to said governor drive device an engine fuel injection volume signal, and for delivering to said load sensing control device a load sensing pressure differential signal for changing the volume of said variable displacement hydraulic pump and thereby changing a pressure differential between said upstream and downstream sides of said actuator control valve;

a rotational speed sensor for said engine;

wherein said controller utilizes a signal from said rotational speed sensor to calculate a difference between a desired engine rotational speed and an actual engine rotational speed detected by said rotational speed sensor, and utilizes the thus calculated difference to compute said engine fuel injection volume signal for operating said engine at a minimum fuel consumption rate under a power designated by said change-over signal from said working mode change-over device.

* * * * *